May 29, 1934. N. H. RICKER 1,960,923
GAUGE FOR DETERMINING PRESSURES IN DEEP WELLS
Filed Dec. 5, 1931
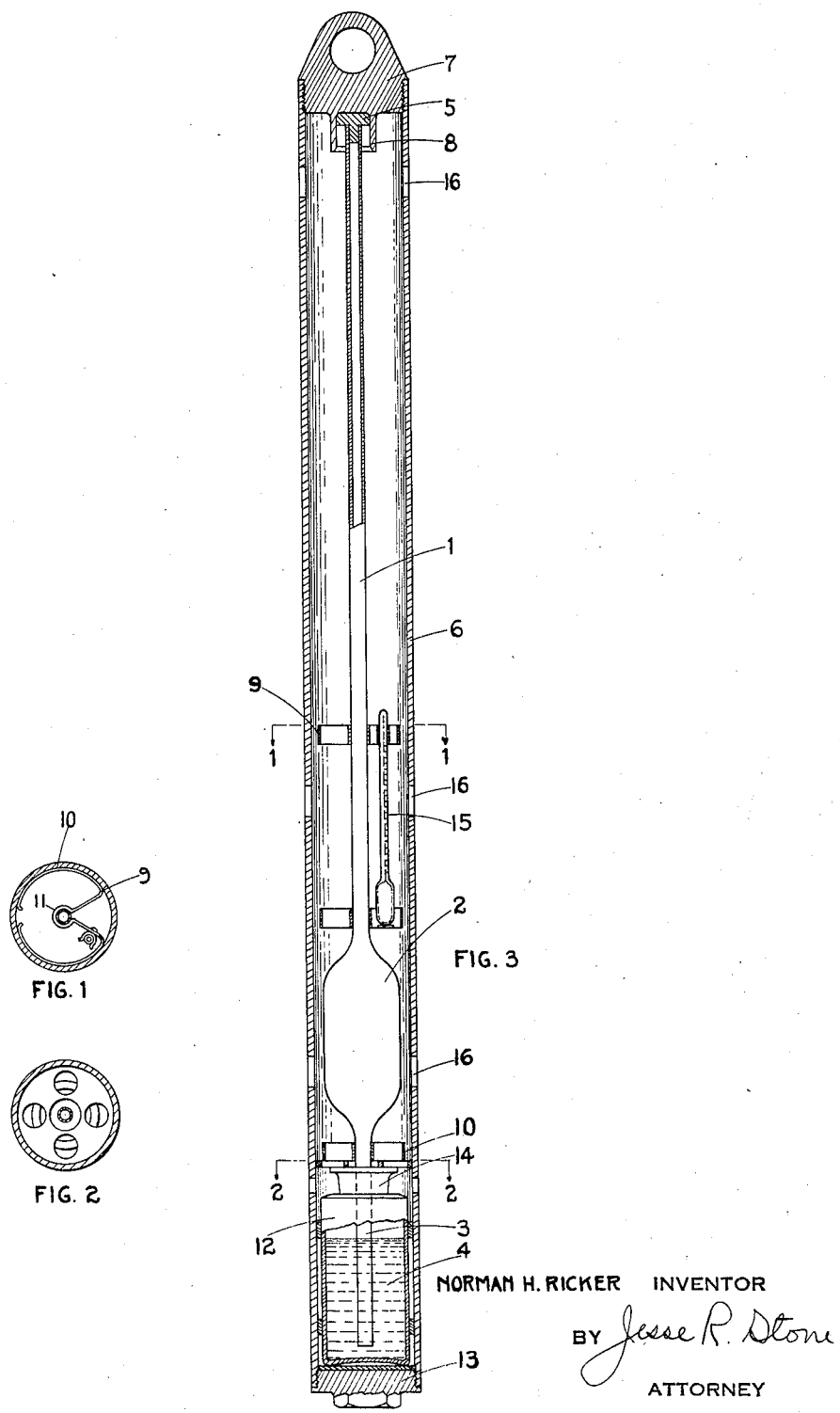
NORMAN H. RICKER INVENTOR
BY Jesse R. Stone
ATTORNEY Patented May 29, 1934

1,960,923

UNITED STATES PATENT OFFICE 1,960,923

GAUGE FOR DETERMINING PRESSURES IN DEEP WELLS

Norman H. Ricker, Houston, Tex., assignor to Hughes Tool Company, Houston, Tex., a corporation of Texas Application December 5, 1931, Serial No. 579,176

5 Claims. (Cl. 73—5)

My invention relates to pressure gauges which may be employed in ascertaining the pressures at various depths, and is particularly adapted for use in deep wells.

It is an object of the invention to provide a simple and convenient portable device which may be lowered into a well where gas pressures are present, to obtain an indication of the fluid pressures existing at different depths therein.

I desire to provide an instrument responsive to the pressure of the gas and liquid confined in the well and to mark an indicating line upon a calibrated tube or scale to show such pressures at the depth to which the gauge is lowered.

The invention includes the simple and convenient structure of the device whereby it may be easily assembled or taken apart when desired.

In the drawing herewith, Fig. 1 is a transverse section on the plane 1—1 of Fig. 3.

Fig. 2 is a similar section taken on the plane 2—2 of Fig. 3.

Fig. 3 is a central longitudinal section through a housing with my invention shown therein.

In carrying out my invention I provide a tube 1, preferably of glass or other transparent material, near the lower end of which is an enlarged chamber or bulb 2. This bulb may be of any desired size, depending upon the degree of pressure to which the gauge is to be subjected. Below the bulb the tube is extended downwardly at 3 to be submerged in an acid or other liquid adapted to form a mark upon the tube. The upper end of the tube 1 is sealed tightly by means of a plug 5.

The tube 1 is mounted within a cylindrical housing 6, preferably of metal or other hard material adapted to protect the tube 1. The upper end of the housing 6 is closed by a nut or plug 7, preferably screwed therein. Said plug has a downwardly projecting annular flange 8, which forms a cup into which the upper end of the tube 1 may project. It fits over the sealing member 5 at the upper end of the tube and holds it firmly in position, centering the tube 1 within the housing. This type of closure allows the upper end to be opened for cleaning when desired.

At suitable intervals along the length of the housing I provide supporting members 9. The shape of these supports is shown best in Fig. 1. I form a resilient clamping member made up of a strap of metal shaped to bear against the side of the tube, by means of arms shown at 10. There are two arms 10 which are bent intermediate their ends and directed inwardly to enclose about the tube 1 at 11. It will be seen that these resilient supports may be placed at any position within the housing and will support the tube centrally thereof.

The marking liquid 4 is contained within a bottle 12 firmly supported in the lower end of the housing upon a plug 13 and having its upper end 14 open to receive the tube 3. Any marking liquid or paint can be used.

I may employ a thermometer 15, also fixed within the housing upon the clamping springs 9. This thermometer is a maximum reading thermometer of ordinary construction and will serve to indicate the highest temperature of the fluid into which the gauge is inserted. It will be noted that the housing 6 has openings 16 in the walls thereof to allow the entrance of fluid to the housing.

As the housing with the tube therein is submerged in the gas or liquid, the said gas or liquid will enter through the opening 16 to the interior thereof and will bear upon the upper surface of the marking liquid 4 and will cause it to rise in the tube 1, compressing the air therein. As the tube is further submerged the head of fluid above the gauge will compress the air further in the tube as it is lowered downwardly and the marking liquid will rise in the tube to a point therein depending upon the pressure exerted by the marking liquid against the air in the tube. The use of the bulb increases the sensitivity of the device due to the larger quantity of air to be compressed. The tube may be formed with a scale thereon, or it may be measured when it is withdrawn from the housing. The marking liquid may be of a character to form a line upon the tube, indicating the height to which it rose in the tube when submerged, or the inner wall of the tube may be covered with a film of litmus or other similar substance which will be changed in color or marked by the action of an acid thereon so that it may be seen to what level the acid rose in the tube. A further method of marking the tube consists in just coating the inside of the tube with a gelatine solution with a trace of phenolphthalein therein. When the tube has dried it is used in the above apparatus with a dilute solution of sodium hydroxide or other base in the bottle. After subjecting the device to pressure and then removing it, the lower parts of the tube will have acquired a red coloration up to the marking point. When the housing is withdrawn it will be possible to determine with accuracy the pressure of the fluid at the depth to which the device was lowered.

This device is particularly adapted for use in deep wells and is therefore built of strong metal so that it may be lowered to great depths in the well and will form an accurate record of the pressures therein. It is particularly adapted to obtain information relative to the formation or "rock" pressures in the well at various depths.

It has the advantage of being simple to construct, economical to manufacture, and convenient to use.

What I claim as new is:

1. A pressure gauge including a transparent tube having a reservoir for gaseous fluid connected therewith near the lower end thereof, the upper end of said tube being closed, a marking liquid into which the lower end of said tube is submerged, and a supporting housing for said tube.

2. A pressure gauge including a transparent tube closed at its upper end and having its lower end open, a bath of marking liquid into which said lower end projects, said liquid being forced upwardly in said tube by gaseous fluid pressure thereon, and means to support said tube.

3. A pressure gauge including a tube closed at its upper end and having an open lower end, a container for marking liquid into which said tube projects, said tube having an air chamber associated therewith, and means to support said tube, said container being open to permit fluid to enter therein.

4. A pressure gauge including a transparent tube, tubular means to support said tube, means on said support to center said tube therein, a closure for the upper end of said tube, said tube having a bulb to increase its capacity, and a container for marking liquid at the lower end of said tube.

5. A pressure gauge including a tube, means to close the upper end thereof, a bottle into which the lower end of said tube projects, said tube having a bulb adjacent the lower end thereof.

NORMAN H. RICKER.